No. 617,833.                                              Patented Jan. 17, 1899.
C. KÜHN.
BALL JOINT.
(Application filed Aug. 22, 1896. Renewed July 20, 1898.)
(No Model.)
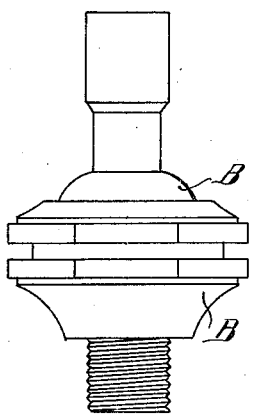
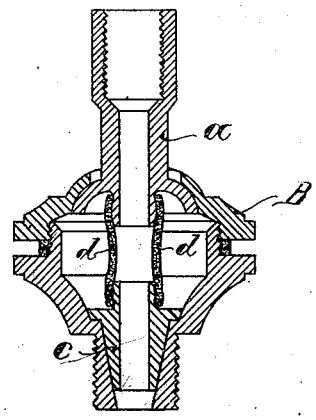
Witnesses:
Inventor:
Carl Kühn
By 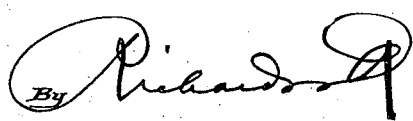
his Attorneys.

UNITED STATES PATENT OFFICE.

CARL KÜHN, OF BERLIN, GERMANY.

BALL-JOINT.

SPECIFICATION forming part of Letters Patent No. 617,833, dated January 17, 1899.

Application filed August 22, 1896. Renewed July 20, 1898. Serial No. 686,467. (No model.)

*To all whom it may concern:*

Be it known that I, CARL KÜHN, a subject of the German Emperor, and a resident of Berlin, in the German Empire, have invented a certain new and useful Improved Ball-Joint, of which the following is a full, clear, and exact description.

The present invention consists of a ball-joint for all kinds of tube, in which the spring as employed in such joints is omitted and a short piece of rubber tube or hose substituted therefor; and in order to render the present specification more easily intelligible reference is had to the accompanying drawings, in which—

Figure 1 is a side elevation of the joint, and Fig. 2 a vertical section through the same.

The tube end $a$ is provided with a curved outwardly-extending shoulder $a'$ in the usual manner, over which the cap B is passed. The body of the joint $c$ is screwed into the cap B in the usual manner, and instead of inserting a spring, as has been hitherto done, a short piece of rubber tube or hose $d$ is suitably fitted in between the under surface of the tube end $a$ and the interior surface of the body of the joint $c$. This piece of tube forms a tubular connection between the parts, which is capable of movement in any direction and at the same time renders the whole joint gas-tight.

I claim as my invention—

The combination of an upper tubular extension having an exteriorly-rounded shoulder $a'$ and downwardly-extending tube-nipple fixed thereunder, a cap B on said extension to fit over said shoulder and movable thereon, a body $c$ attached to said cap and having lower extension to receive the gas-tube and inner upwardly-extending nipple, and a piece of elastic pipe or hose inserted between said cap-supporting shoulder and the body and engaging over both said nipples substantially as described.

In witness whereof I have hereunto set my hand in presence of two witnesses.

CARL KÜHN.

Witnesses:
W. HAUPT,
M. HIRCHLOFF.